Feb. 23, 1954     E. W. BERRIMAN     2,669,996
METHOD FOR MANUFACTURING CIGARS
AND PREFORMED FILLERS THEREFOR
Filed Aug. 10, 1949     6 Sheets-Sheet 1
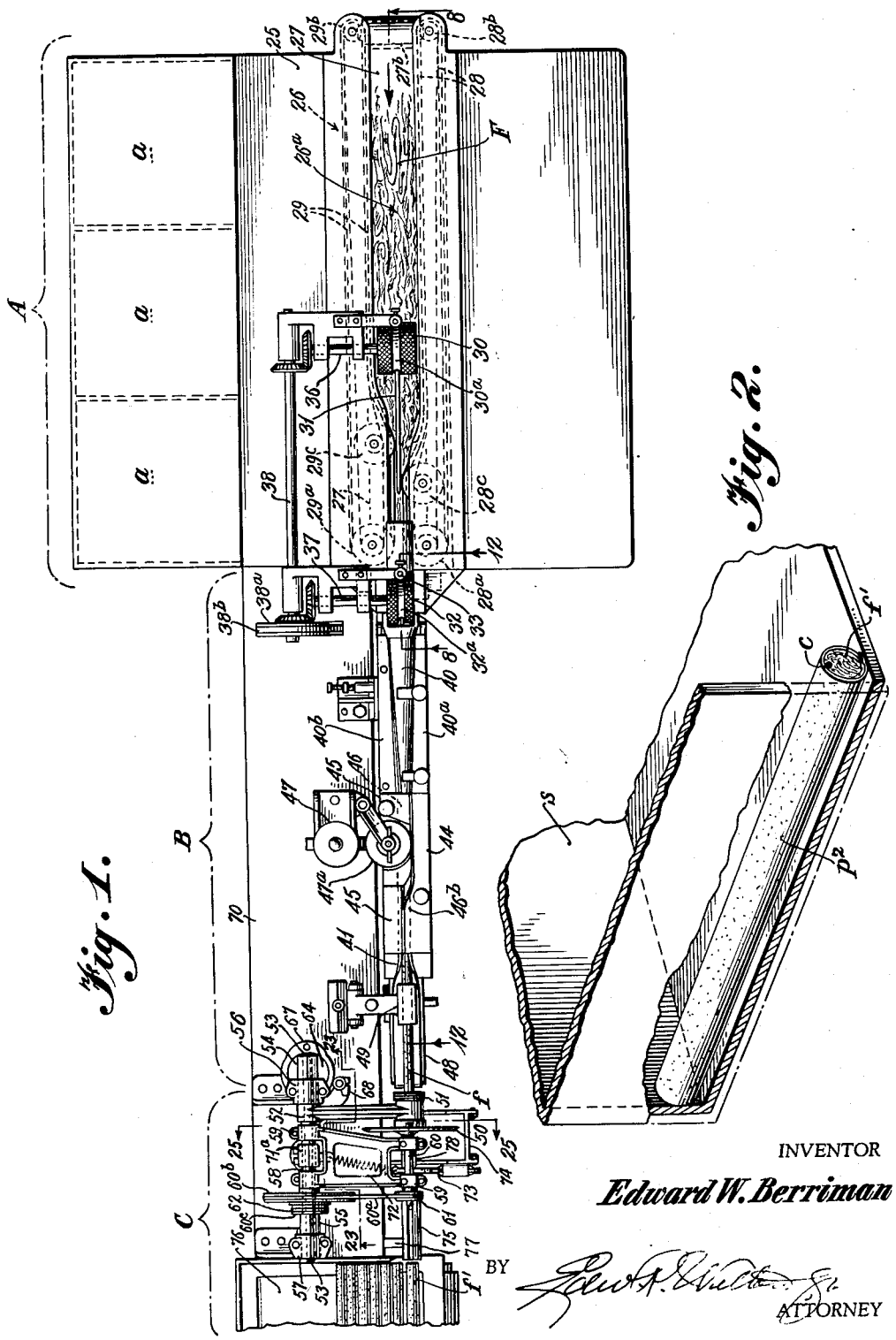
INVENTOR
Edward W. Berriman
BY
ATTORNEY INVENTOR.
Edward W. Berriman
BY
ATTORNEY

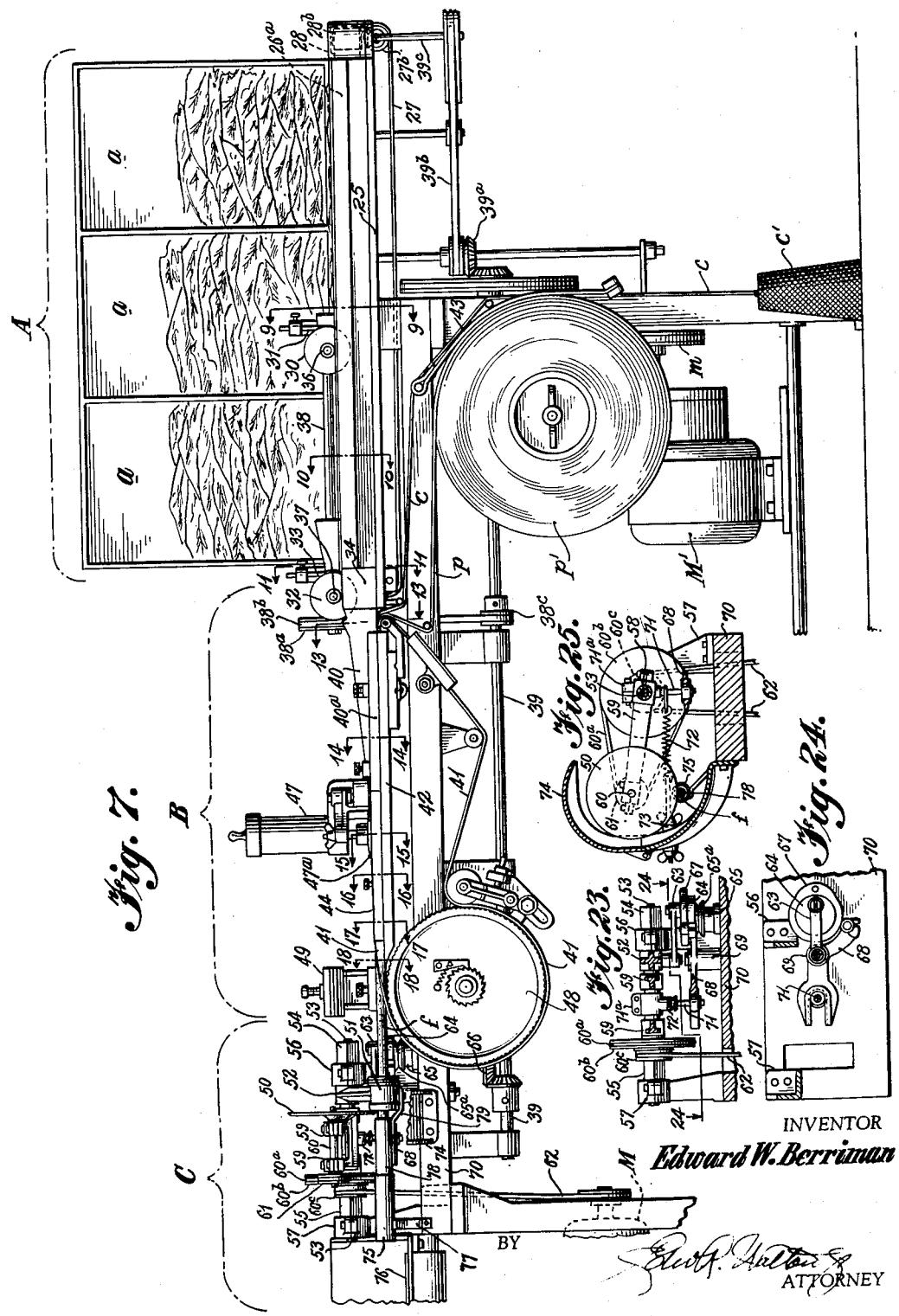

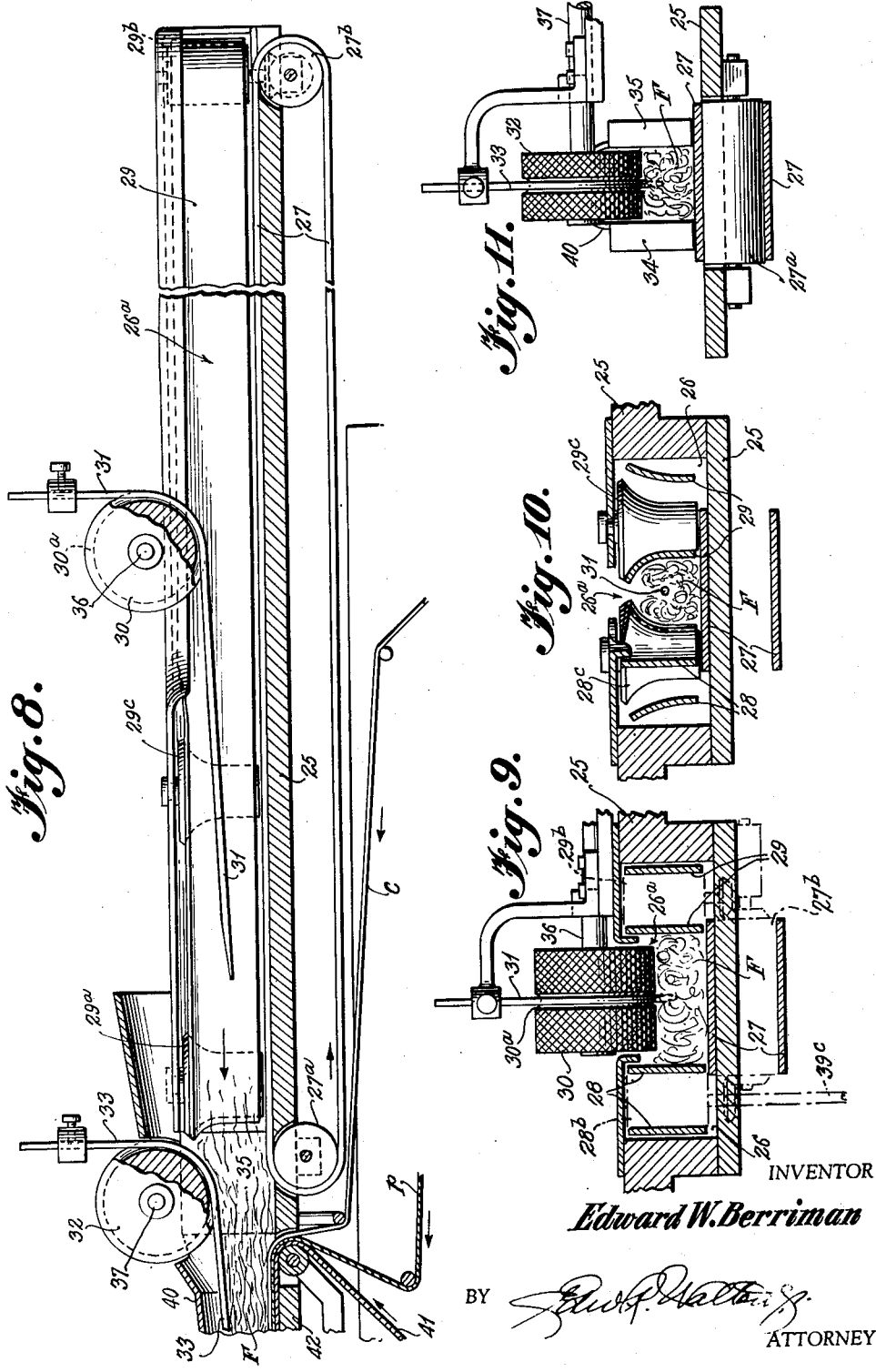

Feb. 23, 1954     E. W. BERRIMAN     2,669,996
METHOD FOR MANUFACTURING CIGARS
AND PREFORMED FILLERS THEREFOR
Filed Aug. 10, 1949     6 Sheets-Sheet 5
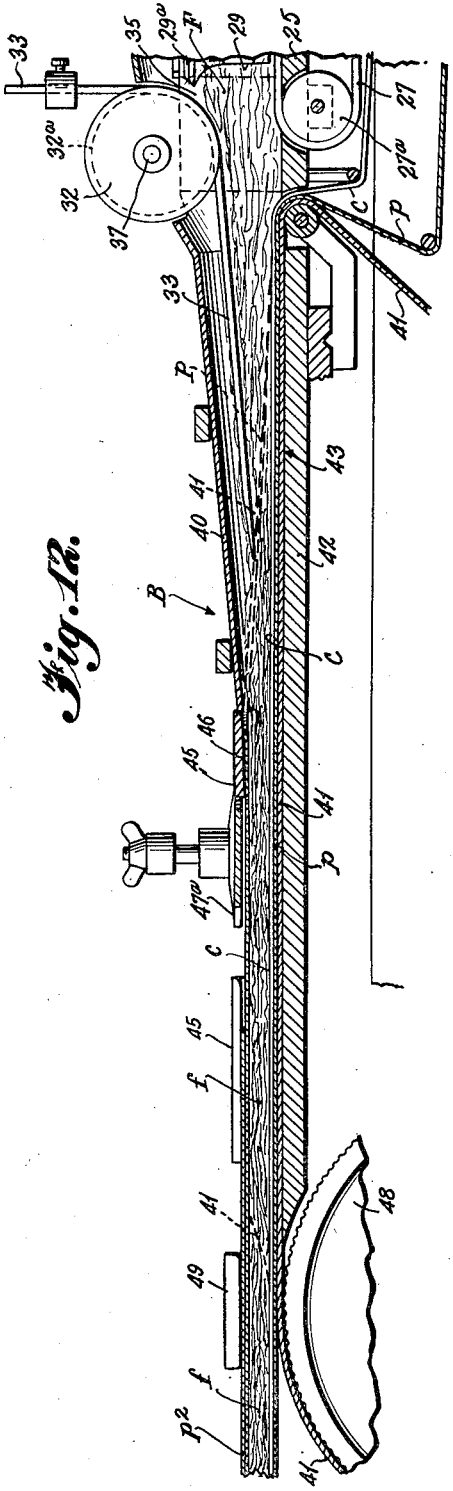
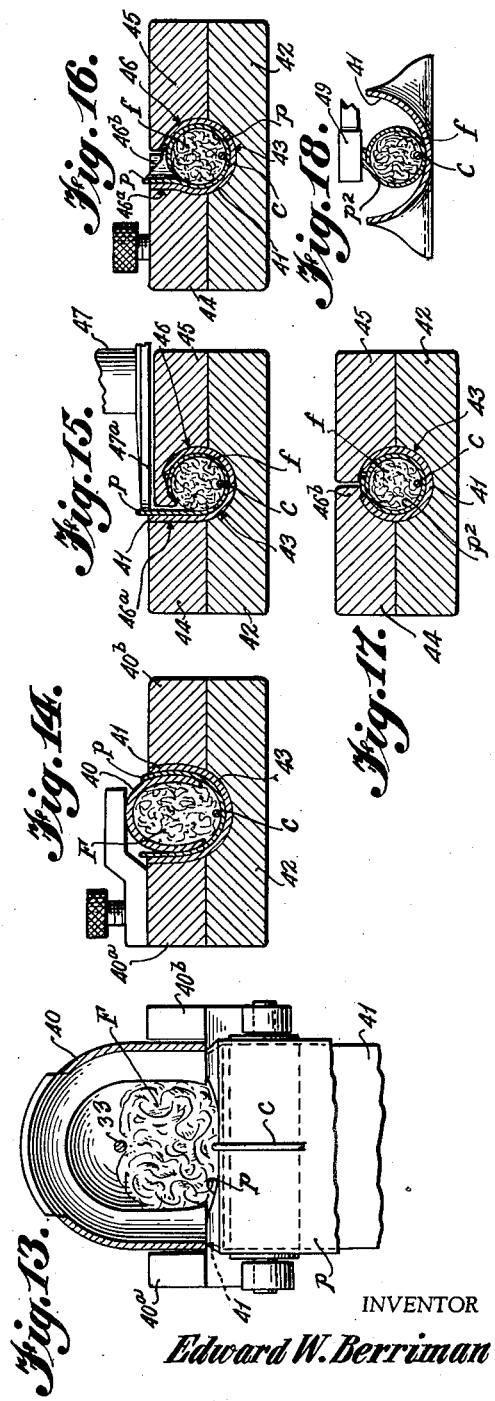
INVENTOR
Edward W. Berriman
BY
ATTORNEY Feb. 23, 1954
E. W. BERRIMAN
2,669,996
METHOD FOR MANUFACTURING CIGARS
AND PREFORMED FILLERS THEREFOR
Filed Aug. 10, 1949
6 Sheets-Sheet 5
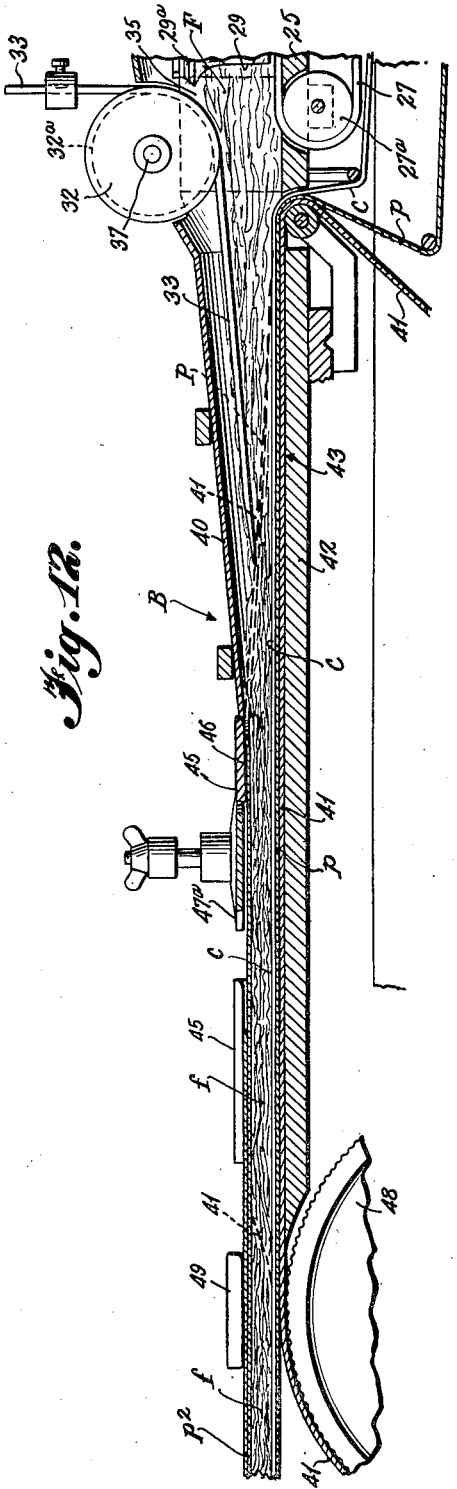
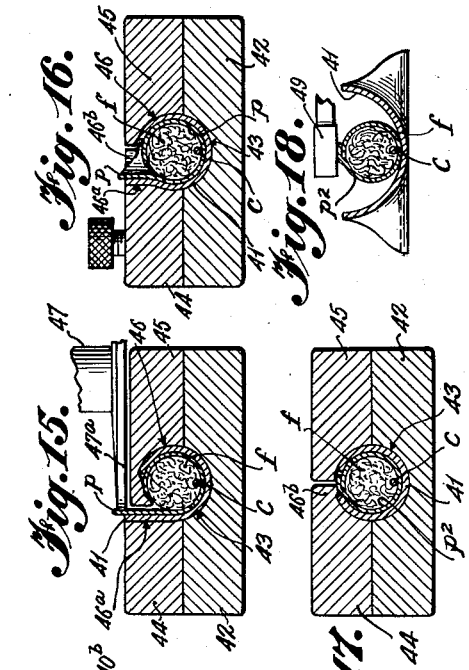
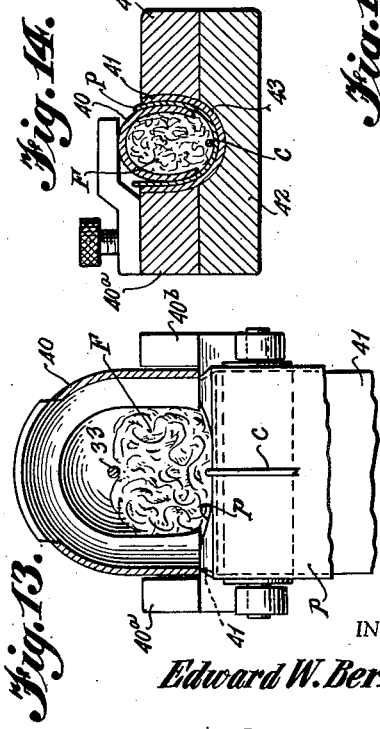
INVENTOR
*Edward W. Berriman*
BY
ATTORNEY

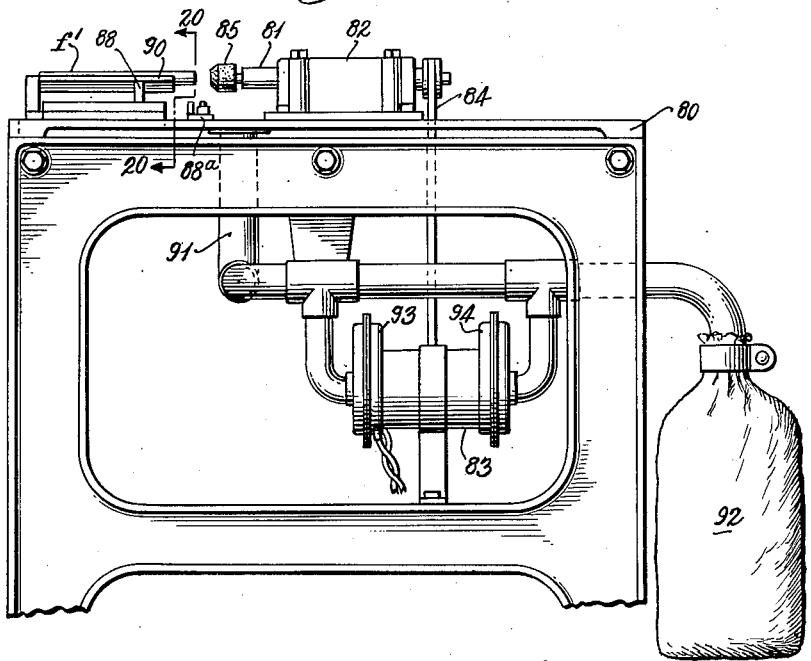
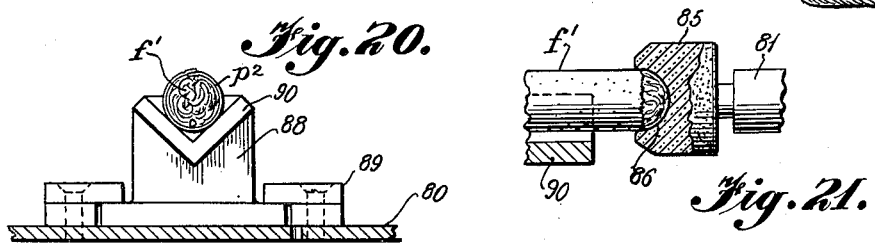
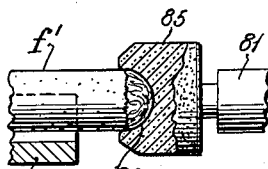
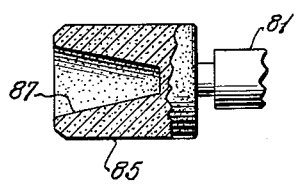

Patented Feb. 23, 1954

2,669,996

UNITED STATES PATENT OFFICE 2,669,996

METHOD FOR MANUFACTURING CIGARS AND PREFORMED FILLERS THEREFOR

Edward W. Berriman, Tampa, Fla.

Application August 10, 1949, Serial No. 109,484

5 Claims. (Cl. 131—20)

The present invention relates to the manufacture of long-filler cigars, wherein the finished cigar has no binder but only a filler and the outer wrapper.

In the manufacture of hand-made long-filler cigars, it has been considered necessary (from the standpoint of good cigar making) to employ a binder of tobacco leaves, during the making of the cigar bunch, to hold and contain the long-filler stemmed half leaves of the embryo cigar, which is then placed in a mold for pre-shaping. The fan-tail ends of this embryonic cigar extend beyond the ends of the mold for handling purposes and to provide, if necessary, sufficient tobacco material for kneading by the "cigar roller" in forming the head and/or tuck at the ends of the finished cigar at the time he applies the wrapper to the cigar-bunch. Substantially this same practice is followed in cigar-making machines for both long and short filler cigars.

Among the many disadvantages of this practice are, in the manufacture of hand-made cigars (and this applies also to similar machine-made cigars) that, (1) the "bunch-breaker," in applying the binder, usually closely wraps the binder about the filler about 2½ to 3¼ times, thus producing about three layers of binder or, when the binder has to be patched, about four layers around the filler, which retard the burning of cigars, because there are less open air passages in the filler for a given cigar ring size; (2) during the course of wrapping on the binder, the filler leaves are twisted which, also and further, retards the drawing qualities of the cigar and, hence, its burning; and (3) where there are uneven overlaps of the binder or one overlap is upon another, the cigar will or has the tendency to burn down one side—all of which the cigar of the present invention eliminates.

Therefore, it is broadly the object of the present invention to produce a cigar having all of the advantageous and desirable features of hand-made cigars while eliminating the disadvantageous features thereof above noted and of the methods of making them, and to produce a finished cigar having no binder but having a long filler with substantially straight and free air passages through the rumpled leaves thereof and enclosed only by a high quality hand-rolled wrapper thus resulting, generally, in better burning and drawing qualities in that the cigars burn more evenly and draw freer.

It is a further object of the invention to produce a cigar, as just mentioned, without use of molds or pressers and to pre-shape the head and/or the tuck of the filler (that the finished cigar is to assume) prior to application of the wrapper, thus greatly increasing the productivity of the "cigar roller" as he does not have to form the head or tuck or extract the bunches singly from molds and saves about 20 percent of the tobacco weights used, as there are no by-products except dust.

Another object of the present invention is to produce a better cigar, having the above stated characteristics and advantages, at less cost than cigars now produced with corresponding tobacco quality or grade (which saving may be passed on to the consumer) while enhancing the financial productive capacity of the "bunch-breakers" and "rollers" employed.

A still further object of the invention is the production of commercial long-filler hand-wrapped cigars of novel and improved construction by a novel method of manufacture which employs hand-bunch breaking, the production of a continuous filler-rod from such hand-bunched long-filler leaves, which is pre-shaped during its making, to the ring size required for a given cigar and then cut to the cigar lengths desired, then forming the head and/or the tuck on the ends of said severed filler lengths, and, then, hand-rolling said preformed filler lengths—denuded of a cover or holding jacket and having their ends shaped to the type cigar desired—with the tobacco wrapper covering.

This specification is supplemented by the accompanying drawings, which illustrate the method and apparatus now employed in the manufacture of cigars according to this invention, and in which drawings—wherein like reference characters refer to like parts through the several views—

Figure 1 is a plan view of an apparatus used for feeding a continuous stream of bunched long-filler leaves and for forming the same into a continuous rod and, then, severing the same into desired sectional lengths;

Figure 2 is a fragmentary perspective view of a handling and storage box containing the filler-rod section or bunch produced by the machine shown in Fig. 1, in accordance with the present invention, and severed to the length of the cigar to be made;

Figure 7 is a front elevation of the mechanism shown in Fig. 1;

Figure 8 is a longitudinal sectional view taken substantially on lines 8—8 of Fig. 1 to illustrate the filler feeding means;

Figure 9 is a transverse sectional view taken substantially on line 9—9 of Fig. 7;

Figure 10 is a transverse sectional view taken substantially on lines 10—10 of Fig. 7;

Figure 11 is a transverse sectional view taken substantially on lines 11—11 of Fig. 7;

Figure 12 is a longitudinal sectional view taken substantially on lines 12—12 of Fig. 1 illustrating the rod forming means;

Figure 13 is a transverse sectional view taken substantially on lines 13—13 of Figure 7;

Figure 14 is a transverse sectional view taken substantially on lines 14—14 of Figure 7;

Figure 15 is a transverse sectional view taken substantially on lines 15—15 of Fig. 7 and illustrating the application of paste to one edge of the paper strip;

Figure 16 is a transverse sectional view taken substantially on lines 16—16 of Fig. 7 and illustrating the manner of folding the pasted edge upon the remainder of the filler-rod;

Figure 17 is a transverse sectional view taken substantially on lines 17—17 of Fig. 7 and illustrating the completion and formation of the filler-rod;

Figure 18 is a transverse sectional view taken substantially on lines 18—18 of Fig. 7 and illustrating the pasted paper seam of the filler-rod passing under a dryer or sealer and the manner in which the rod feeding belt releases the rod;

Figure 19 is a side view of the filler rod section or bunch head and/or tuck forming means shown in Fig. 3;

Figure 20 is a fragmentary transverse sectional view taken substantially on lines 20—20 of Fig. 19;

Figure 21 is a view illustrating the manner in which the filler-rod section or bunch is fed to a grinding stone for forming the head;

Figure 22 is a similar view to Fig. 21 but shows a grinding stone shaped for forming the tuck on a filler-rod section into a "perfecto" shape;

Figure 23 is a fragmentary detail section of the filler-rod cut-off device and taken substantially on line 23—23 of Fig. 1;

Figure 24 is a view similar to Fig. 23 and taken substantially on line 24—24 of Fig. 23; and Figure 25 is a view similar to Fig. 23 and taken substantially on line 25—25 of Fig. 1.

Figure 3:
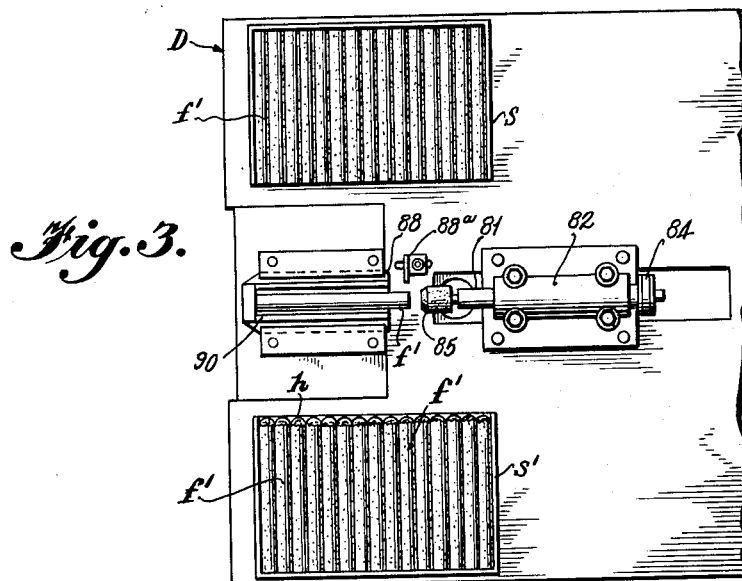
Figure 3 is a plan view of the head and tuck and forming station at which the ends of the filler-rod sections are so formed, the apparatus shown in this view being means for operating a grinding stone and more particularly shown in Figures 19 to 22 inclusive.

While the drawings show one example of apparatus employed in the method of making the cigars, it is to be understood that it is not to be limited to the specific or particular type of apparatus shown as other types of apparatus may be used to effect the present invention.

In carrying the invention into practice an operator (who may be a "bunch breaker"), is positioned at a feeding station A (Fig. 1) where there are a plurality of bins $a$ within easy reach and containing different types of stemmed longfiller cigar tobacco half-leaves F, there usually being about three bins containing different types of tobacco for the desired blend. The operator, by reaching into the bins, selects several leaves from each bin and each leaf is laid in a hand of the operator with its longitudinal dimension across the palm of the hand, which is then closed to rumple the leaves transversely, resulting in ways or passages in the leaves extending longitudinally thereof. This operation is performed as each leaf is successively gathered, laid in the operator's hand with the tips of the leaves extending in one direction and gathered together in the manner stated, as is done by a "bunch-breaker" in making cigars by hand. The leaves so gathered and rumpled, as above stated, are then placed into a conveying channel $26a$ at the said station A with the leaf-tip ends always in the same direction for good results. This operation is repeated by the operator and each filler portion, so gathered and rumpled, is laid in the channel $26a$ successively with the leaves of the portion overlapping the leaves of the preceding laid portion, care being taken, of course, that there will not be any undue thicknesses at the overlapping ends of each laid portion of rumpled filler leaves. When the channel $26a$ is filled in the manner above stated to the proper height, for the particular ring-size of cigar that is being made, the machine is started and is kept continuously running at a speed consistent with the ability of the operator to keep the channel $26a$ filled with the rumpled tobacco filler leaves F.

The stream of rumpled long-filler leaves F in the channel $26a$ are fed to the filler rod-forming mechanism B and, just prior to its entry into the mechanism B, the longitudinal edge portions of the stream of leaves F in the said channel are moved upwardly and folded over upon the remaining portion to give said filler stream an approximate cylindrical shape (see Figs. 1, 8 and 10) as they enter the conical filler shaping tongue 40 of the rod-forming mechanism B. The progress of the filler, from this point, through the mechanism B may be accomplished by an endless conveyor belt 41 passing over a bed-plate 42 that may have a channel 43 on its top surface and concaved as required to provide a complement to the other forming or shaping and folding elements of the mechanism B as is well known in cigarette rod-forming machines. The belt 41 passes under and about the tongue 40 and through the folding tube 46 of the familiar cigarette making machine (see Figs. 7, 8, 12 to 18).

At the point of entry of the belt 41 onto the bed-plate 42 it carries with and upon it a strip of cigarette paper $p$ fed from a roll $p'$, by reason of its contact with the belt 41, the width of the paper $p$ being, preferably, in excess of the width of the belt; and trained to be disposed longitudinally of and upon said paper strip is a rip-cord $c$ preferably positioned along the longitudinal center of the continuous paper strip $p$ so as to lie between the paper and the tobacco filler material, the cord being supplied from the hank $c'$. While passing through the semi-conical tongue 40, as is well understood, the continuous stream of tobacco filler leaves is evenly distributed, compacted and rolled by the interior side walls thereof into cylindrical form and to the required diameter approximately the ring-size of the cigar to be made; and the side edge portions of the belt 41 and of the paper $p$ fold upwardly on the exterior surfaces of the tongue by reason of guide blocks 40a and 40b as illustrated in Figure 14.

As the filler, cord, paper and belt approach the reduced extremity of the tongue 40, the filler, with the paper and belt embracing it, is so shaped as to enter the folding tube 46 (defined by bed 42 and guide blocks 44 and 45) but with one edge of the belt 41 and paper strip $p$ upstanding and at least the marginal edge of paper $p$ extending through a slot 46a therein (Fig. 15) which marginal edge passes in contact with a pasting wheel 47a of a paster device 47, which wheel applies paste to the inner face of said edge which is then folded (by an overhanging portion 46b of the folder-tube) down upon the other previously inturned or folded side of the paper $p$, thus providing a paper jacket $p^2$ around it.

Progressing from the folding-tube 46, the belt 41 is released from its curled embrace about the filler-rod $f$, thus formed, and flattens as it passes over its driving pulley wheel 48. As the belt frees the filler-rod $f$, the seamed pasted edges of the paper jacket $p^2$, surrounding the tobacco filler, passes under a sealer 49 which applies heat and slight pressure to the pasted seam.

The filler-rod $f$, thus completed, continues to move axially and is severed transversely by a knife 50 at the station C into lengths required for a given size cigar. This severing operation may be performed manually, but it is preferred to accomplish it automatically by feeding the completed filler-rod $f$, as it progresses from the mechanism B, first into a guide sleeve 51 and then into a discharge tube 75 spaced axially from the guide sleeve 51; and then having a rotary circular knife 50 passed transversely through the space between the sleeve 51 and the tube 75 and transversely of the filler-rod $f$ at properly timed intervals. The guide-sleeve 51 and the discharge tube 75 are, of course, axially aligned with the filler-rod $f$ from the mechanism B. The discharge tube 75 is stationarily supported in position by a bracket 77 on the table 70 of the machine and has at its end, adjacent the guide sleeve 51, a telescoping tubular extension 78 fixedly spaced from the guide sleeve 51 and connected to the guide sleeve 51 by link 79 (Fig. 7). The guide sleeve 51, however, reciprocates axially of the filler-rod and is supported in position by an arm 52 fixed to an arbor 53.

The arbor 53 is disposed substantially parallel to the movement of the filler-rod $f$ and has enlarged angular end portions 54 and 55 fixed thereon slidably mounted in bearing brackets 56 and 57, respectively, secured to the bed or table 70. The portion of the arbor 53, between the connection of the arm 52 therewith and its enlarged end 55, is surrounded by a sleeve 58 which is rotatable thereon. Clamped to the said sleeve 58 is a yoke-like supporting frame 59, in the distal end of which is journalled a spindle 60 upon one end of which the knife 50 is mounted for rotation therewith. The other end of the spindle carries a pulley 61 over which passes a belt 60a for driving the spindle 60 from a double pulley 60b—60c mounted on the sleeve 58 for free rotation thereon. As can be observed from Figures 1, 7 and 23, the parts 52, 59 and 60b—60c are mounted on the arbor 53 in close position and which arbor forms a carriage for reciprocating these parts as well as the knife 50 and guide sleeve 51 axially of the filler-rod $f$. This reciprocation of the arbor 53 may be accomplished by pitman rod 63 (see Figures 23 and 24) connected at one end to the arm 52 and at its other end to a disc 64 mounted on the end of a shaft 65, which latter is actuated through gears 66 from the drive shaft 39. At this point it might be mentioned that the pasting wheel 47a may be rotated from a belt driven from the pulley 65a on the shaft 65.

In order that the rotary knife 50 may be brought into severing contact with the filler-rod $f$ and withdrawn from the kerf at properly timed intervals, while the filler-rod is progressing in its movement, the knife frame support 59 is oscillated to and fro. One direction of this oscillating movement which brings the knife into a timed or gradual cutting stroke for severing the filler-rod, may be accomplished by a face cam 67 on the peripheral edge of the disc 64 and which cam engages one end of a cam arm 68 pivoted intermediate its ends, as at 69, to the end table 70 and having its other end bifurcated and receiving therebetween the end of a rod 71 projecting from the sleeve 58 and made fast thereto by the clamp 71a.

After the rotary knife 50 has severed a length of the filler-rod $f$, the knife is immediately raised by the tension of a spring 72 connected at one end to the rod 71 and at the other end to an adjustable bracket 73 carried on the knife guard 74. The whole arrangement is such that when the arbor 53 is just about to move from its furtherest right hand position, as shown in Figures 1 and 7, the cam 67 moves the knife frame downwardly to bring the knife into severing contact with the filler-rod $f$ and continues this severing movement until the rod has been severed, this severing movement occurring while the filler-rod is progressing forwardly, it being understood that the movement of the arbor 53 is in the same direction as the movement of the filler-rod and is synchronized to move at the same speed of the filler rod. During this movement, the extension 78 of the discharge tube will telescope into the discharge tube 75 by reason of the link connection 79 so as to give support to the filler rod at points adjacent the cut being made by the knife 50. When the severing movement has been completed, the high point of the cam 67 will have been passed and the tension, which has been placed upon the spring 72, will then raise the knife frame 59 and withdraw the knife from the path of the filler-rod, at which time the position of the disc 64 will be such as to move the arbor (and those parts which it carries) back to the position shown in Figures 1 and 7. The timing of the oscillating operation of the knife 50 may be changed to produce different lengths of severed sections or bunches $f'$ of the filler-rod $f$ by changing of the gears 66 to a different ratio or size.

The severed sections within the delivery tube 75 are pushed therethrough by the succeeding severed section and are discharged upon a delivery table 76 (see Figures 1 and 7) where they are examined.

The severed filler-rod portions or sections $f'$ (Fig. 1) are then gathered and placed in a suitable storage box $s$ (Fig. 2) and permitted to dry sufficiently so that the tobacco filler thereof will retain its shape and the filler-rod section $f'$ will be self-sustaining when the paper jacket $p^2$ is removed therefrom. A portion of this drying time may be consumed while performing the next steps in the production of the cigar. The purpose of the paper jacket $p^2$ about the tobacco filler-rod $f$ and filler section $f'$ is two fold, (1) it permits the formation of a continuous filler-rod which may be easily severed into clean-cut desired lengths and (2) it temporarily retains the filler tobacco in rod form to the size or diameter given to it, by the forming tongue 40 and folding tube 46, while the filler is drying to that shape and size prior to the application of the wrapper and while shaping the ends thereof.

Figure 4:
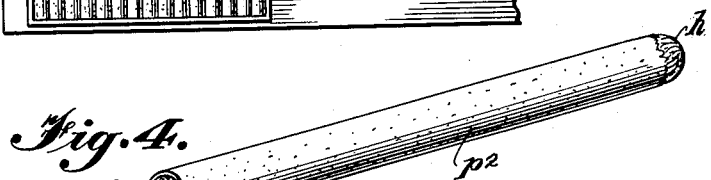
Figure 4 is a perspective view of the filler-rod section after it has been treated at the station shown in Fig. 3.

The next step is the forming of the head and/or tuck (as the case may be) on the ends of the several filler-rod sections $f'$. This shaping may be accomplished by skiving or paring or passing the ends of the cigar over a roughened surface to form the ends of the sections $f'$ as may be desired. It is preferred, however, to employ a grinder for this purpose, as shown in Figs. 3, 19, 20, 21 and 22, in which a rotary abrasive block 85 is hollowed to the shape that will produce the desired head or tuck for a given cigar when an end of the filler-section $f'$ is moved axially into the hollowed portion of the grinding block. This abrading, in addition to shaping the end of the filler section $f'$ to form the head or tuck of the finished cigar will assume, also removes the paper jacket $p^2$ from the abraded portion, as shown in Fig. 4.

Figure 5:
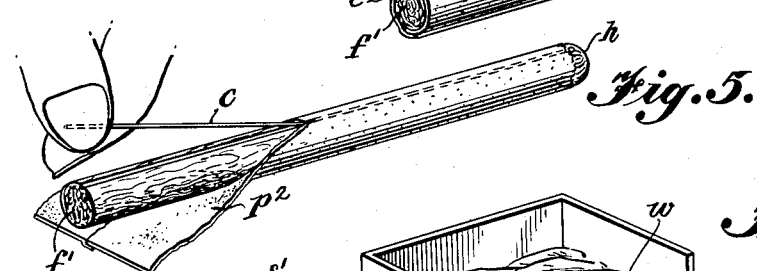
Figure 5 is a perspective view of a filler-rod section being denuded of the temporary jacket that holds the tobacco filler material in shape while drying.
Figure 6:
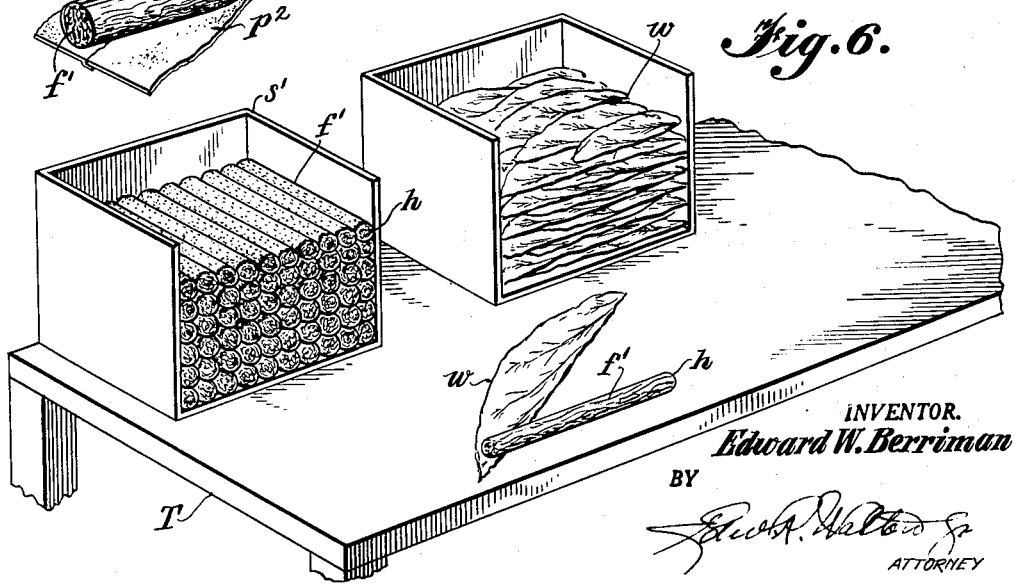
Figure 6 shows the hand rolling station at which the denuded filler section or bunch is wrapped with a tobacco leaf wrapper to complete the cigar.

After the shaping of the head and/or tuck of the filler-rod section $f'$, the operator then places the latter in a suitable storage box $s'$ which goes to the table T (Fig. 6) of the "cigar roller," who with his fingers grasps an end of the rip-cord $c$ and, by pulling the same in a manner illustrated in Fig. 5, tears off the paper jacket $p^2$ and manually applies a tobacco leaf wrapper $w$ by the usual hand-rolling operation to the denuded tobacco filler-rod section $f'$ as shown in Fig. 6.

Due to the fact that these filler-rod sections or bunches $f'$ are all cut to size and shaped at their ends, according to the type of cigar being made, and this shaping of the head and/or tuck does not diminish the over-all length of the filler, the "cigar roller" does not have to shape the filler with his hands to form the tuck or head, as is now the practice in hand rolled cigars, but covers the shaped end with the wrapper leaf $w$ and is able to increase his efficiency 50% to 60% over the regular methods employed, known as "mold work."

As indicated above, in carrying the invention into effect, use is made, in addition to manual operations, of a well known apparatus having the mechanisms B and C (Figs. 1, 7 and 12) that forms a continuous filler-rod and automatically severs it in lengths according to the length of the cigar desired. As examples of types of apparatus that may be employed for this purpose, reference is made to the United States Patents No. 739,897 (Figs. 5, 6 and 7), 1,630,488 and 1,787,551. Machines of this type, however, have long been used for cigarettes having shredded tobacco or, in some cases, for a type of cigarette having flaked or short filler tobacco (often called "cigaretos") enclosed in a paper wrapper, as a finished commercial product and, therefore, these machines have a tobacco feeding mechanism adapted for feeding to the cigarette forming tongue and channels that particular kind of tobacco. Since the present invention is concerned with long-filler cigars, a special type of filler feeder A is employed with the cigarette or rod-forming mechanism B.

With particular reference to Figs. 1, 7 to 11, the long-filler bunch-feeding means A comprises a table 25 having a horizontal trough 26 therein which is substantially rectangular in cross-section and opened at the top-side and at its ends, one end of the trough abutting and aligning with the filler-rod forming mechanism B. An endless feed belt 27 has its upper reach or run disposed longitudinally on the bottom surface of the trough and is trained over pulley rolls 27a and 27b positioned at opposite ends of said trough; and endless "rolling" belts 28 and 29 extend along opposite side walls of the channel 26 and pass about pulleys 28a—28b and 29a—29b, respectively, at the ends of said trough with their adjacent or opposing reaches of belts 28 and 29 overlying belt 27 longitudinally—so that, together, the belts 27, 28 and 29 provide a moving channel 26a progressing (in the direction of the arrow) to deliver the rumpled filler leaves toward the receiving end of the filler-rod forming mechanism B.

Just in advance of the area of the channel 26a into which the operator places the rumpled filler leaves, as above described, a driven knurled wheel 30 is disposed over the channel and protrudes downwardly into the channel 26a to aid in advancing the filler leaves and to slightly compress them in said channel (Figs. 8 and 9) and, further, to this end, is a spring-wire rod 31 which extends forwardly at a declination from a circumferential groove 30a in said wheel to exert a slight pressure on the top center of the stream of rumpled filler leaves F.

As can be seen from Figs. 1 and 8, the feeding channel 26a narrows toward its delivery end at the mechanism B and is so formed as to cause the longitudinal edges of the stream of rumpled filler-leaves therein to be successively rolled within the channel upwardly and inwardly toward each other about the wire-rod 31, as indicated in Fig. 10, so as to cure the stream of leaves into a substantially semi-cylindrical formation. This may be accomplished, as shown, by having the pulleys 28a and 29a set closer together than the pulleys 28b and 29b and in having their upper ends flare outwardly, or spool-shaped, with their flared peripheries in close proximity; and in having positioned behind each pulley 28a and 29a idler-guiding rolls 28c and 29c, respectively, similar to the pulley 28a and 29a, and disposed between the reaches of belts 28 and 29 and opposite the wire rod 31. The roll 29c is positioned slightly to the rear of the roll 28c so that the edge of the stream of filler nearest the belt 29 is folded over first and the other edge of the filler is subsequently folded.

At the point where the moving channel 26a delivers the bunched stream of filler leaves F to the rod-forming mechanism B, the receiving end of the rod-forming tongue 40 of that mechanism is dimensioned to be slightly larger than the cross sectional dimension of the supply of filler leaves being delivered to it by said channel 26a (see Figs. 8, 11 and 12) and, also, positioned above this point of delivery is a second driven knurled wheel 32 substantially the same as wheel 30—except being of a width to correspond with the width of the channel at the delivery point—from which forwardly extends for a distance, at a slight declination, a spring-wire rod 33 into the tongue 40 from the under circumferential surface of the wheel 32. The wheel 32 assists in the continuous movement of the filler stream into the rod-forming mechanism B and the rod 33 presses on the top of the substantially cylindrical stream of filler leaves within these parts 32 and 33 insuring against any leaves that may protrude from the mass, from jamming or clogging at the mouth of the tongue 40, the rumpled filler leaves F having a natural tendency to straighten out when not confined. Suitable guide surfaces 34 and 35, lying on opposite sides of the wheel 32, form a continuation of the inner opposing surfaces of the belts 28 and 29, or, if it is desired, the surfaces 34 and 35 may be provided by rearwardly extending corresponding side surfaces of the tongue 40.

The wheels 30 and 32 may be mounted, respectively, on shafts 36 and 37 and driven from a shaft 38 having a pulley wheel 38a over which a belt 38b passes and is driven, as at 38c from a common drive shaft 39 that drives all the actuated parts of the rod forming mechanism B, in timed synchronism. In like manner, the belts 27, 28 and 29 are driven in unison and in the same direction from the shaft 39 through beveled gears 39a, belt 39b passing over a pulley on the shaft 39c, connected with suitable gearing driving pulleys 27b, 28b and 29b.

The rod-forming mechanism B, comprising the shaping-tongue 40, the folding tube 46, the paster 47, sealer 49, and the cutting mechanism C are substantially shown in the patent to Moesinger 739,897 and the patent to Ruau 1,787,551 and, therefore, a further detailed description of this mechanism is not deemed necessary—except to say, in the present showing a motor M drives the knife spindle 60 through means of the belt 62 which passes over pulley 60c, which is fast or integral with pulley 60b, and the belt 60a which connects pulleys 60b and 61; and a motor M' drives the common drive shaft 39 which also drives the belt pulley 48, drives the shaft 65, that actuates pitman rod 63, which reciprocates the arbor 53, and also actuates cam 67 which causes knife-frame 59 to oscillate and may actuate the paster wheel 47a.

The shaping of the head or tuck end of a filler-rod section f', as above described, may be performed upon a grinding mechanism D which comprises a table 80 having on its top a rotary shaft 81 suitably journalled in an anti-frictional bearing 82 and driven by a motor 83 by a belt 84, the motor being suitably mounted in a bracket beneath the table-top and driven at approximately 12,000 revolutions per minute. Mounted on one end of the shaft is an abrasive stone 85 which has its outer surface hollowed, as at 86 in Fig. 21 or 87 in Fig. 22, in accordance with the desired type of head or tuck to be given to any particular cigar, or batch thereof, then being made, the hollowed portion 86 or 87, of course, being concentric with the axial center of the shaft 81.

Positioned on the top of the table, in axial alignment with the stone 85, is a slidable carriage 88 mounted in guide ways 89 for to-and-fro movement relative to the stone 85. The carriage 88 carries a trough 90 positioned thereon to axially align a filler-rod section f' with the cavity 86 or 87 in the abrasion stone 85 on the shaft 81. An operator, positioned before the carriage 88, takes a rod-filler section f' from a storage box s and lays it in the trough 90 with the proper end to be shaped opposite the stone 85; and then moves the carriage to bring said end of the filler-rod section f' into contact with the hollowed portion 86 or 87 of the stone and gently feeding the same toward the stone until the carriage strikes the adjustable stop 88a at which time the grinding operation has been performed. The carriage is then moved backwardly from the stone by the operator and the filler-rod section f', with an end so shaped (as shown in Fig. 4), is placed in a storage box s'; and this operation is again repeated on successive filler-rod sections f'. If the cigar is to be a blunt or panatella shape the other end of the filler-rod section f' does not have to be further shaped but, if the cigar is to be of perfecto or queen-shape, for instance, the storage box s' will be moved to another grinding device D equipped with a stone 85 having the required cavity so that the other end of the filler-rod section f' may be formed.

The resulting tobacco dust from this grinding of the head or tuck is conveyed by suction into a pipe 91 and discharged in a collecting bag 92, the suction being created by suitable impellers, indicated at 93 and 94, driven from the motor 83 in a manner well known in the art. The upper end of the suction pipe 91 extends and opens through the top of the table 80 underneath the grinder stone 85. It has been found that one operator can shape one end of approximately 15,000 to 20,000 filler-rod sections f' per day of eight hours, the range above given depending upon the expertness of the operator.

The cigars produced as a result of the above method and apparatus meet all of the advantages which have been set for them, as mentioned in the forepart of this specification, and are produced at great speed and low cost, thus enabling the producer to give to the public a long-filler, hand-bunched and hand-wrapped cigar with high quality tobacco at considerably reduced prices than by other methods.

Having thus described the invention and the manner in which the same is to be performed, it is to be understood that this invention is not to be limited to the exact steps and apparatus herein shown and described as the same may be varied within the scope of the appended claims and the spirit of the invention.

That which is claimed as new, is:

1. A method of manufacturing a finished long-filler hand-wrapped cigar which comprises hand rumpling a plurality of superposed long-filler tobacco leaves in a direction substantially transversely of said leaves, repeatedly placing groups of said rumpled superposed leaves in successive overlapping relation along a path of travel to form a continuous stream of filler-leaves with said leaves extending longitudinally of said direction of travel, feeding said stream of filler-leaves along said path of travel and causing the longitudinal edge portions of said stream of filler-leaves to curl upon the remaining portion, then continuously bringing said curled stream of filler leaves into longitudinal contact with a continuous strip of disposable sheet material having a rip-cord applied thereto and progressively reducing the diameter of said fed stream of filler-leaves, wrapping and securing said sheet material about said continuous stream of filler-leaves to form a continuous jacket-enclosed filler-rod of the approximate ring-size of the cigar being made, then severing said filler-rod as it progresses in its travel into desired cigar lengths, then allowing a time interval for the filler leaves of the severed lengths of filler-rod to set to said ring-size; then shaping an end or ends of the severed jacket-enclosed lengths of said filler-rods according to the style of cigar being made, then removing said jacket of disposable sheet material from a length of filler-rod by means of said rip-cord, and then hand-rolling a tobacco leaf wrapper onto each of said denuded pre-shaped lengths of filler-leaves.

2. A method of manufacturing a finished long-filler hand-wrapped cigar which comprises feeding a stream of overlapped and superposed long-filler tobacco leaves along a path of travel, forming said stream of filler-leaves as it progresses in its travel to a substantially bunch shape and bringing it progressively into contact with a continuous strip of disposable sheet material having a rip-cord applied thereto, wrapping and securing said sheet material and said rip-cord about said continuous stream of filler-leaves to form a continuous jacket-enclosed filler-rod of the approximate ring-size of the cigar being made with said rip-cord extending lengthwise of said filler-rod, then severing said filler-rod into desired cigar lengths, then shaping an end or ends of the severed jacket-enclosed lengths of said filler-rods according to the style of cigar being made, then removing said jacket of disposable sheet material from a said length of filler-rod by means of said rip-cord, and then hand-rolling a tobacco leaf wrapper onto each of said denuded pre-shaped lengths of filler-leaves.

3. A method of manufacturing a finished long-filler hand-wrapped cigar which comprises feeding superposed long-filler tobacco leaves in successive overlapping relation along a path of travel to form a continuous stream of filler-leaves, forming said stream of filler-leaves to a bunch shape while progressing in its path of travel, continuously applying and securing a sheet of rippable material having incorporated therein a ripping means about said shaped stream of filler-leaves as it progresses in its travel to form a continuous jacket-enclosed filler-rod of the approximate cross-sectional shape of the cigar being made, then severing said filler-rod into desired cigar lengths, then removing material from an end or ends of the severed jacket-enclosed lengths of said filler-rods to shape the same according to the style of cigar being made, then operating said ripping means to rip said jacket of sheet material from said lengths of filler-rod, and then hand-rolling each of said denuded preshaped lengths of filler-leaves with a tobacco wrapper.

4. A method of manufacturing a pre-shaped long-filler cigar tobacco-bunch to which a tobacco wrapper may be applied, said method comprising the steps of feeding superposed long-filler tobacco leaves in successive overlapping relation along a path of travel to form a continuous stream of filler-leaves with said leaves extending longitudinally of said direction of travel, forming said stream of filler-leaves to a bunch shape while progressing in its path of travel and bringing it progressively into longitudinal contact with a continuous strip of disposable sheet material having incorporated therein a ripping means, wrapping and securing said sheet material about said continuous stream of filler-leaves to form a continuous jacket-enclosed filler-rod of the approximate cross-sectional shape of the cigar to be made, then severing said filler-rod as it progresses in its travel into desired cigar lengths, then removing material from an end or ends of the severed jacket enclosed lengths of said filler-rods to shape the same according to the style of cigar being made, and then operating said ripping means to remove said sheet material from a length of filler-rod, when a tobacco leaf wrapper is to be applied onto said denuded pre-shaped lengths of filler-leaves to form the finished cigar.

5. A method of manufacturing a preshaped long-filler cigar tobacco bunch to which a tobacco wrapper may be applied, said method including the steps of feeding superposed long-filler leaves in successive overlapping relation along a path of travel to form a continuous stream of filler-leaves and forming said traveling stream cylindrical-like, wrapping and securing about said cylindrical-like stream of filler leaves a continuous strip of disposable sheet material with a rip-cord lying between said sheet material and filler leaves and said sheet material to form a continuous jacket-enclosed filler-rod of the approximate cross-sectional shape of the cigar to be made, then severing said filler-rod into desired cigar lengths, then shaping an end or ends of the severed jacket-enclosed lengths of said filler-rods according to the style of cigar being made, then removing said jacket of disposable sheet material from a length of filler-rod by means of said rip-cord, when a tobacco leaf wrapper is to be applied onto said denuded pre-shaped length of filler-leaves to form the finished cigar.

EDWARD W. BERRIMAN.

References Cited in the file of this patent

UNITED STATES PATENTS

| Number | Name | Date |
| --- | --- | --- |
| 271,006 | Whitney | Jan. 23, 1883 |
| 398,877 | Bright | Mar. 5, 1889 |
| 452,012 | Baron | May 12, 1891 |
| 546,638 | Butler | Sept. 17, 1895 |
| 587,828 | Hudson | Aug. 10, 1897 |
| 589,121 | Carper | Aug. 31, 1897 |
| 593,385 | Venners | Nov. 9, 1897 |
| 655,254 | Ludington | Aug. 7, 1900 |
| 662,775 | Davis et al. | Nov. 27, 1900 |
| 1,555,498 | Kaelble | Sept. 29, 1925 |
| 1,630,488 | Di Ianni | May 31, 1927 |
| 1,637,800 | Bronander | Aug. 1, 1927 |
| 1,838,115 | Schussler | Dec. 29, 1931 |
| 1,964,052 | Halstead | June 26, 1934 |
| 1,995,068 | Lim | Mar. 19, 1935 |
| 2,100,108 | Rober | Nov. 23, 1937 |
| 2,213,869 | Richter | Sept. 3, 1940 |
| 2,367,911 | Wells | Jan. 23, 1945 |